Patented June 21, 1932

1,864,497

UNITED STATES PATENT OFFICE

OLE SEVERSON, OF SHELTON, CONNECTICUT, ASSIGNOR TO THE O. K. TOOL COMPANY, INC., OF NEW YORK, N. Y., A CORPORATION OF NEW YORK

METHOD OF FORGE-WELDING STELLITE

No Drawing. Application filed July 27, 1928. Serial No. 295,848.

This invention is addressed to the problem of providing a comparatively cheap shank (superior steel, for example) with a cutting or wear-resisting tip or face of a chrom-cobalt alloy such as the well-known and so-called "stellite".

It is desirable that the body-portion or shank of various types of cutting tools (for machining metals, drilling wells, etc.,) shall be strong, tough, readily shapable, but not too costly. Their cutting portions, however, should possess great hardness and be highly resistive to deformation.

Perhaps the nearest approach to this desideratum results from the widely-prevailing method of tipping steel shanks by what is known as "drip-welding" stellite thereto; a rod of this high fusing alloy being melted, drop by drop, in an oxy-acetylene flame. Thereby an irregular grape-like mass of stellite can be more or less firmly affixed to the steel shank, and when cold brought to shape by a rather laborious grinding operation. An inspection of the finished product will, however, reveal minute pin-holes throughout the coalesced mass of the stellite, and it will also be observed that the union between it and the steel is not a uniformly perfect or complete "weld". Nevertheless, for want of a better, this method is widely employed for fabricating a large proportion of the manufactured stellite.

Stellite possesses a hardness which renders it incapable of being machined while cold other than by grinding and if it be attempted to re-shape a tip so made by heating in a forge and swaging with a hammer in the ordinary manner, it will be found that, unlike the steel of the shank, the tip of stellite will crumble or spatter and not yield to any effort made by the smith to forge it.

This invention is predicated upon the discovery that if the white hot stellite be wholly under confinement by the walls of a rigid retaining mould the stellite may, in this plastic state, by the application of sufficient pressure, be compacted into a homogeneous mass closely conforming with the shape of the space determined by the outwardly immovable walls of the retaining mould. The resultant article when permitted to cool is a closely compacted metal part the contour of which closely conforms with the shape of the inner cavity of the mould.

The objects of this invention are specifically concerned with a novel and practical method of applying this discovery to the fabrication of a machine tool cutter having the usual relatively mild steel and more easily machined body-portion and provided with immediate cutting tips of stellite or other similar alloys which do not readily lend themselves to the ordinary methods of metal-working. It has been found that these tips may be applied in a surprisingly efficient manner of which the following is illustrative.

The shank or particular body member is suitably shaped with the desired portion thereof prepared to receive the special alloy tip. The body member is then placed in relation with a mould or die section such that the portion to which the special alloy is to be welded is confined within rigid retaining walls of suitable material and of the desired shape. The special metal such as the heretofore described stellite heated to a temperature corresponding to a color bright orange to white which renders it readily susceptible to deformation is then applied in a suitable quantity. The manner of applying the stellite may vary but a practical one has been found to be that of causing it to build up drop by drop through the medium of arc or drip welding. After the desired amount of stellite, in a plastic state, has been applied a second die section is then employed which mates with the first section, the two providing a space within which the alloy is confined in contact with the body member. By the application of pressure the two sections are adapted to approach thus contracting the space and causing the alloy to be moulded into shape and firmly welded onto the body member. In actual practice the application of pressure and thereby the moulding of the stellite is accomplished as in the process of forging with a board hammer. The important point is that the stellite is fully confined and subjected to pressure causing it to be tightly compacted throughout and into engagement with the shank to which it is applied.

A stellite-tipped cutting tool manufactured in this manner and under these conditions presents a relatively smooth outer surface, and having substantially the shape desired in the finished product requires but little grinding. The metallic mass though not possessing such properties of coherence as to permit of the usual open or partially confined forging thereof but, being in this case totally confined and under high pressure, is caused to flow into all the narrowed regions and the finished product presents a sharp contour where desired such that but little grinding is required to bring out a smooth even cutting edge. Also upon the cutting edge having become worn further grinding assures a new cutting edge of like smoothness having no ragged portions. This results from the uniform closely knit texture of the entire mass free from minute pinholes.

This method of joining the special alloy to the body member likewise results in a complete intermingling of the adjacent molecules to form a very strong and scarcely distinguishable union.

The method and apparatus for producing the above results have been described in a somewhat general manner it being obvious that various specific apparatuses may be employed to accomplish the functions and results described, e. g., the structure employed to confine the metallic masses may consist of the lower section of a die similar to that commonly used to make the forgings for cutting tools of this type and a suitable upper die form complemental thereto but differing from the ordinary die forms in that the special alloy is entirely and positively confined with a definite space, there being no opening or intervening crack between the mating parts of the die to permit of the outward flow of metal therethrough. One section of the die may even form part of the die set for forging out the body member, after such operation having taken place the other section is then replaced by one capable of co-operating with the first section to confine the special alloy in the manner described. The exact temperatures for the respective metals are selected in accordance with the particular composition and circumstances. Any well known means for applying pressure to the co-acting confining members may be resorted to such as hydraulic piston means, screw operated apparatus, power press, or drop hammer.

Having thus revealed this invention, I claim:

1. The method of welding stellite cutting tips on metal cutting tools consisting of applying a suitable mass of stellite to the desired portion of the cutter body, said stellite being in a plastic state; and applying pressure to the stellite while maintaining it wholly confined within a space defined by the said cutter portion and rigid forming walls, said stellite being sufficiently plastic whereby it readily assumes a shape exactly conforming to said defined space.

2. The method of welding on a metal cutter body, cutting tips of special alloys not adaptable to the ordinary methods of metal forging consisting of applying a suitable quantity of the alloy in a plastic state to the desired portion of the cutter body; imposing pressure on the plastic mass; and simultaneously maintaining it completely confined within a space defined by rigid walls, said applied alloy being sufficiently plastic to enable it to be compressed into exact conformity with said defined space.

3. The method of welding special alloy cutting tips, not adaptable to ordinary metal forging operations, to a cutter body of relatively mild steel consisting of applying a selected mass of the alloy to the desired portion of the cutter body, said alloy being heated to a plastic state; and applying pressure to said mass while maintaining it in contact with said body portion and wholly confined within rigid retaining walls.

4. The method of tipping cutter tools with a special alloy comprising applying a quantity of the alloy in a highly heated state to the desired portion of the cutter body; wholly confining said alloy within a space defined by said cutter body and retaining walls, a portion of which is movable relative to the remaining wall structure; and applying pressure to cause said alloy to adhere to said cutter body, said alloy being heated to a sufficiently plastic state to exactly conform with and to completely fill the space defined within said retaining walls and cutter body.

5. The method of tipping cutter tools with a special alloy consisting of wholly confining said alloy within a space defined by a portion of the cutter body and surrounding rigid walls, said alloy being at a temperature at which it is plastic; moving a wall portion under pressure relative to the remaining walls and cutter body to reduce the space and to cause said alloy to assume a shape under pressure completely filling said space and to be welded to the cutter body.

6. The method of tipping cutter tools with stellite consisting of confining said stellite in a heated plastic state within rigid walls and in contact with a portion of the cutter body; reducing the defined space by inward movement of a wall portion under pressure, said stellite being wholly confined to cause it to be compressed into completely filling said space and forming a weld with the cutter body.

7. The method of tipping a cutter tool with special alloys not adaptable to ordinary forging operations consisting of applying a mass of the alloy to the desired portion of the cutter body said mass being at a temperature sufficiently high to be plastic; confining said mass within a space determined by rigid walls including the body portion; and causing said mass to adhere to said cutter body and to assume a definite desired shape by inwardly moving a wall portion under pressure said mass being maintained in a completely confined space during the compression thereof.

8. A method of fabricating cutter tools having a relatively mild steel body portion and a special alloy cutting tip consisting of forming the body member with a portion adapted to receive the special alloy; applying the special alloy in a plastic state thereto; confining said portion and alloy within a positively determined space; and applying pressure to the confined mass.

In witness whereof, I have hereunto subscribed my name.

OLE SEVERSON.